United States Patent [19]

Suman

[11] Patent Number: 4,778,218
[45] Date of Patent: Oct. 18, 1988

[54] ADJUSTABLE HEADREST

[75] Inventor: Michael J. Suman, Zeeland, Mich.

[73] Assignee: Prince Corporation, Holland, Mich.

[21] Appl. No.: 941,294

[22] Filed: Dec. 12, 1986

[51] Int. Cl.$^4$ .............................................. A47C 1/10
[52] U.S. Cl. .................................... 297/391; 297/284; 297/409
[58] Field of Search ............... 297/391, 409, 406, 407, 297/284, DIG. 8, DIG. 3

[56] References Cited

U.S. PATENT DOCUMENTS

| 93,662 | 8/1869 | Archer | 297/409 |
|---|---|---|---|
| 2,434,007 | 1/1948 | O'Dea | 297/409 X |
| 2,589,155 | 3/1952 | Smith . | |
| 2,652,101 | 9/1953 | Samsky et al. | 297/409 X |
| 2,781,082 | 2/1957 | Decker . | |
| 3,179,072 | 4/1965 | Coriell | 297/338 |
| 3,510,150 | 5/1970 | Wilfert . | |
| 3,537,749 | 11/1970 | Putsch et al. . | |
| 3,547,486 | 12/1970 | Herzer et al. . | |
| 3,680,912 | 8/1972 | Matsuura . | |
| 3,695,700 | 10/1972 | Flach . | |
| 3,744,843 | 7/1973 | Barecki et al. | 297/391 X |
| 3,795,021 | 3/1974 | Moniot . | |
| 3,948,562 | 4/1976 | Grabner et al. . | |
| 4,082,354 | 4/1978 | Renner et al. . | |
| 4,099,779 | 7/1978 | Goldner . | |
| 4,113,310 | 9/1978 | Kapanka . | |
| 4,123,104 | 10/1978 | Andres et al. . | |
| 4,191,422 | 3/1980 | Inasawa et al. . | |
| 4,191,423 | 3/1980 | Goldner . | |
| 4,205,878 | 6/1980 | Wooten . | |
| 4,265,482 | 5/1981 | Nishimura et al. . | |
| 4,278,291 | 7/1981 | Asai . | |
| 4,285,081 | 8/1981 | Price . | |
| 4,304,439 | 12/1981 | Terada et al. . | |
| 4,324,431 | 4/1982 | Murphy et al. | 297/284 |
| 4,334,709 | 6/1982 | Akiyama et al. | 297/284 |
| 4,350,389 | 9/1982 | Parsson et al. . | |
| 4,351,563 | 9/1982 | Hattori . | |
| 4,370,898 | 2/1983 | Maruyama . | |
| 4,415,203 | 11/1983 | Cawby | 297/391 |
| 4,466,662 | 8/1984 | McDonald et al. . | |
| 4,466,663 | 8/1984 | Oishi et al. . | |
| 4,489,979 | 12/1984 | Zyngier . | |
| 4,511,180 | 4/1985 | Klaus . | |
| 4,527,834 | 7/1985 | Zyngier . | |
| 4,540,217 | 9/1985 | Suzuki . | |
| 4,544,203 | 10/1985 | Younger et al. . | |
| 4,558,903 | 12/1985 | Takagi . | |
| 4,576,413 | 3/1986 | Hatta . | |
| 4,600,240 | 7/1986 | Suman et al. . | |
| 4,629,253 | 12/1986 | Williams | 297/284 X |
| 4,657,304 | 4/1987 | Heesch et al. | 297/391 |
| 4,693,515 | 9/1987 | Russo et al. | 297/284 X |

FOREIGN PATENT DOCUMENTS

| 405937 | 7/1921 | Fed. Rep. of Germany | 297/391 |
|---|---|---|---|
| 3048688 | 9/1981 | Fed. Rep. of Germany | 297/409 |
| 3042802 | 6/1982 | Fed. Rep. of Germany | 297/391 |
| 249008 | 3/1926 | United Kingdom | 297/391 |
| 1411528 | 10/1975 | United Kingdom | 297/391 |

OTHER PUBLICATIONS

The Newport Catalog, Copyright 1987, Covers and Pages G16 & G17. Applicant's Exhibit A.
Newport Corporation 1983–84 catalog. Applicant's Exhibit B.

Primary Examiner—Joseph Falk
Assistant Examiner—Laurie K. Cranmer
Attorney, Agent, or Firm—Price, Heneveld, Cooper, DeWitt & Litton

[57] ABSTRACT

A headrest assembly includes a support plate attached to a seat and to which a head engaging padded member is movably attached. A pivot coupling extends between the plate and headrest for controlling the movement of the padded headrest toward and away from the support plate. In order to move the headrest, a fluid cylinder such as a pneumatic bellows is interposed between the support plate and the headrest.

18 Claims, 2 Drawing Sheets

ADJUSTABLE HEADREST

BACKGROUND OF THE INVENTION

The present invention relates to headrests and particularly to headrests which are adjustable.

Headrests and particularly headrests for use in vehicles have included a variety of mechanical structures for permitting the headrest to be elevated and lowered or tilted to accommodate the user of the headrest. Such adjustments typically must be made while the vehicle is at rest inasmuch as in most cases a significant effort is required to manipulate such adjustable headrests. Recently, headrests have been made more easily adjustable by the utilization of spring-biasing and a releasable control. U.S. Pat. No. 4,600,240 illustrates a tiltable headrest with a spring control mechanism which can be relatively easily adjusted. Although representing a significant improvement in ease of operation, this system requires a considerable number of structural elements and is therefore somewhat costly.

SUMMARY OF THE PRESENT INVENTION

The system of the present invention provides a relatively easily adjusted headrest which is adjustable by using a fluid cylinder and which includes a minimum number of parts. The headrest assembly includes support means attached to a seat and to which a head engaging padded member is movably attached. Coupling means are provided for controlling the movement of the padded headrest portion to the support for controlled motion toward and away from the support member. In order to move the headrest portion, a fluid cylinder such as a pneumatic bellows is interposed between the support and the headrest and means are provided for selectively applying pneumatic pressure to the bellows for providing the selected adjustable movement of the headrest. In one embodiment of the invention bias means were employed for retracting the headrest toward the support when air pressure is relieved from the bellows. In a preferred embodiment, the means for providing controlled movement of the headrest with respect to the support comprises a pair of generally orthogonally mounted hinge means each including three pivot connections for allowing stable parallel movement of the headrest toward and away from the support means.

The headrest construction of the present invention thereby provides a relatively uncomplicated construction which can be easily adjusted by the vehicle operator by controlling a source of fluid pressure even while the vehicle is in use thereby significantly improving the usability of the headrest during different driving conditions or by different vehicle operators or passengers. These and other objections, features and advantages of the present invention will best be understood by reference to the following description thereof together with the accompanying drawings in which:

DETAILED DESCRIPTION OF THE PREFERRED EMBODIMENT

Figure 1:
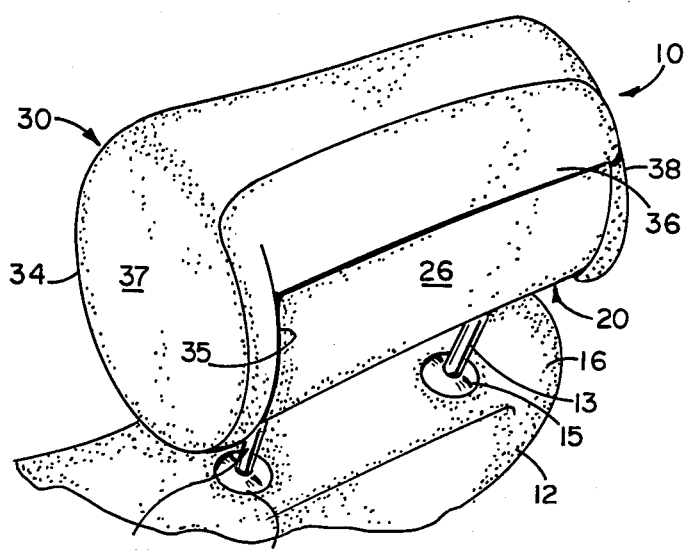
FIG. 1 is a perspective view of a seat with a headrest embodying the present invention shown in a first position.
Figure 2:
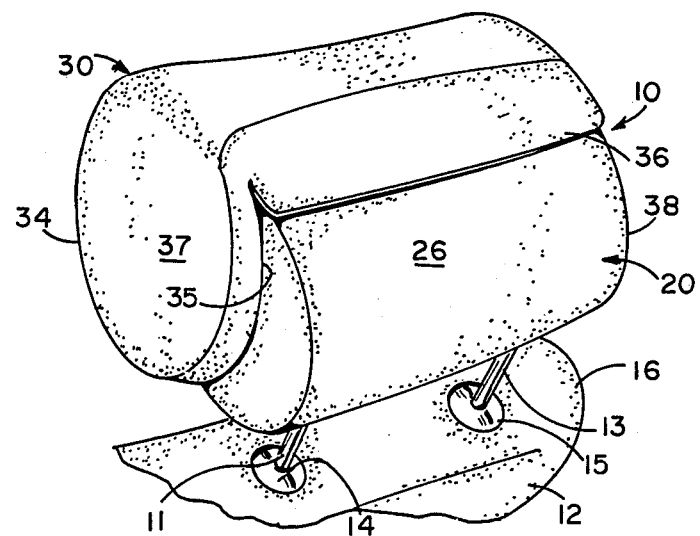
FIG. 2 is a perspective view of the headrest shown in FIG. 1 shown in a second position.
Figure 3:
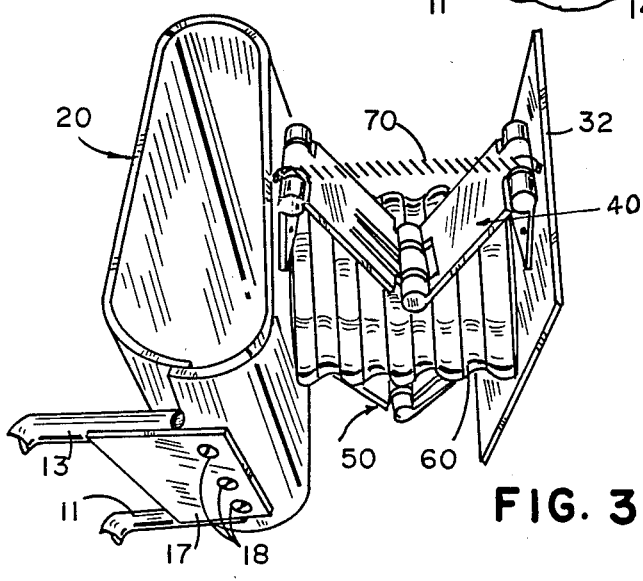
FIG. 3 is a right side elevational view of the structure shown in FIGS. 1 and 2 with the padding and upholstery removed.

Referring initially to FIGS. 1 and 2 there is shown a headrest assembly 10 embodying the present invention and one which is adapted for mounting to the back of a seat 12 of a vehicle such as an automobile by means of a pair of spaced generally vertically extending support arms 11 and 13. Arms 11 and 13 are slidably mounted within friction collars 14 and 15 secured to the vehicle seat such that the headrest assembly 10 can be adjusted vertically by pulling or pushing on the headrest assembly vertically toward and away from the upper edge 16 of the seat. The headrest assembly comprises a formed sheet metal backing support member 20 (FIGS. 3 and 4) which is secured to arms 11 and 13 and is fixed with respect to the arms by a mounting plate 17. The upper ends of arms 11 and 13 are formed in an inverted L-shape and welded to plate 17 as shown. Plate 17 in turn is fastened to the lower edge of support 20 by fastening screws 18. Support 20 comprises, as best seen in FIG. 3, a sheet metal loop of generally rectangular material with a tapered upper end. As seen in FIGS. 1 and 2 support 20 is covered by a suitable padding and upholstery material 26 on its surface to provide an attractive headrest support which blends with the vehicle interior and particularly the vehicle seat 12.

Movably supported with respect to support member 20 is the headrest 30 which comprises, as best seen in FIG. 3, a generally rectangular support plate 32 which is covered by a padded upholstered member 34 as seen in FIGS. 1 and 2. Member 34 comprises a generally cylindrical member having a rear opening 35 into which support 20 can nest as best seen in FIG. 1. The interface between members 20 and 30 is covered by a movable flap 36 such that the interconnecting elements are not visible. Member 34 includes a pair of disc-shaped end members 37 and 38 which cover the ends of the generally cylindrical member which is secured to the flat rectangular plate 32 by conventional fastening means.

Figure 4:
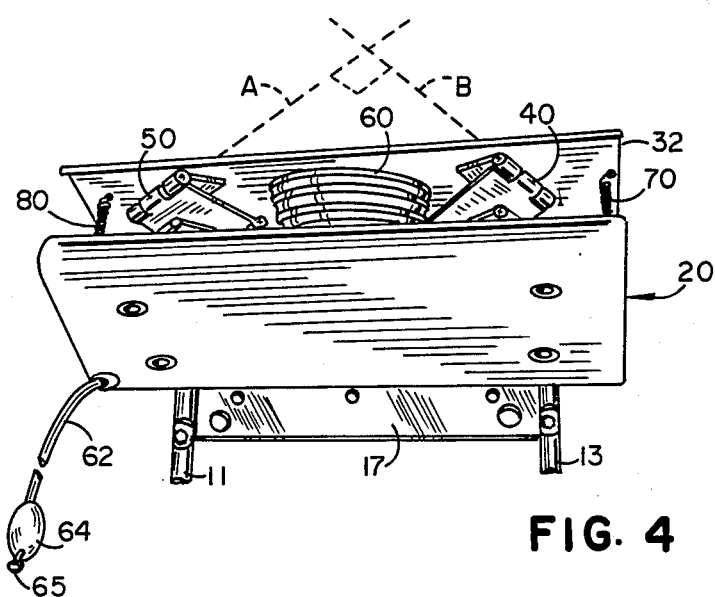
FIG. 4 is a left upper perspective view of the structure shown in FIG. 3.
Figure 5:
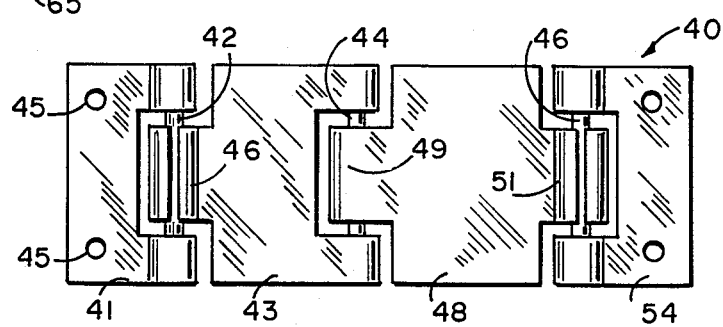
FIG. 5 is a top plan view of one of the hinge means employed in connection with the headrest shown in FIGS. 1-4.
Figure 6:
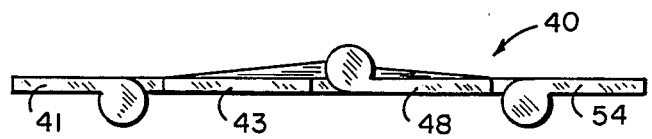
FIG. 6 is a front elevational view of the structure shown in FIG. 5.

Plate 32 is movably coupled to support member 20 by means of a pair of hinge means 40 and 50 which are of substantially identical construction but which are mounted with their hinge axes approximately in orthogonal relationship as best seen in FIG. 4 with the dotted line extensions A and B as seen in FIG. 4 intersecting at an approximately 90 degree angle. The preferred embodiment of the hinge means is shown in FIGS. 5-8 described in greater detail below. Hinge means 40 and 50 are positioned near opposite ends of the rectangular plate 32 to provide a space therebetween into which a fluid cylinder such as a pneumatic bellows 60 is mounted. Bellows 60 in the preferred embodiment has an end fitting bolted to the forwardly facing surface of support 20 and an opposite end fitting bolted to plate 32 in a conventional manner. A pneumatic supply line 62 selectively supplies the bellows with air and can be actuated by a hand-actuated pump such as bulb 64 with a pressure release valve 65 mounted thereon or by an electric pneumatic pump with a suitable switch and venting valve. When pneumatic pressure is not applied to the bellows, it collapses into the position shown in FIGS. 1 and 4 under the force of bias means comprising a pair of tension strings 70 and 80 which are coupled between the member 20 and plate 32 on opposite sides near the ends thereof to pull plate 32 towards the stationary headrest support 20. The ends of springs 70 and 80 include loops which can be bolted to plate 32 or member 20 or which can be fastened by hooking them through a pair of apertures in these members. Thus with no pneumatic pressure applied, the headrest will assume the position shown in FIG. 1. As pressure is selectively applied to the bellows 60 the bellows expands and the headrest 30 moves progressively forwardly and hinges 50 and 60 open as shown in FIG. 3 to allow the headrest to move forwardly as illustrated in FIG. 2. The amount of air pressure applied to the bellows will determine the adjusted position of the headrest with respect to the support. Thus the means for moving the headrest 30 with respect to support 20 in the preferred embodiment comprises a pneumatic cylinder and bias springs for collapsing the cylinder when no pressure is applied.

The coupling means for controllably guiding the movement of the headrest plate 30 in parallel relationship with respect to support 20 comprises in the preferred embodiment a pivoted coupling comprising a pair of generally rectangular spaced hinge means 40 and 50 positioned in generally orthogonal relationship to one another to prevent skewing of plate 30 with respect to support 20 and provide guided and controlled motion of the headrest with respect to the backing support. A preferred embodiment of the three axis hinge means is shown in FIGS. 5-8 now described.

Each of the hinges 40 and 50 are identical and therefore only hinge 40 is described in detail in these figures. As noted each of the hinge means includes three pivot axles 42, 44 and 46 with hinge means 42 joining end mounting plate 41 to an intermediate plate 43. Plate 41 is secured as best seen in FIG. 4 to the headrest plate 32 by means of a pair of fastening bolts and for such purposes provided with a pair of spaced apertures 45. Plate 41 is fork shaped and receives a tang 46 on intermediate plate 43 having a semi-cylindrical open socket for snap-fitting the tang to pivot axle 42 which is secured between the tines of the fork shaped plate 41 to pivot with respect to axle 42.

Figure 7:
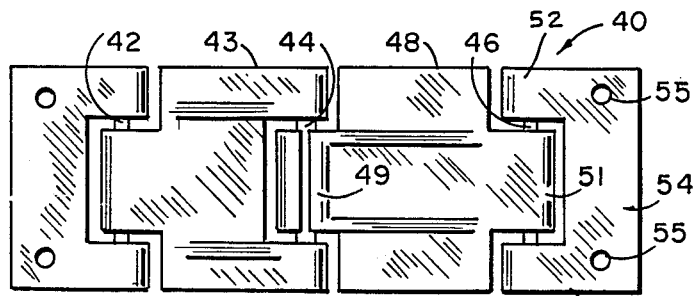
FIG. 7 is a bottom plan view of the hinge means shown in FIG. 5.
Figure 8:
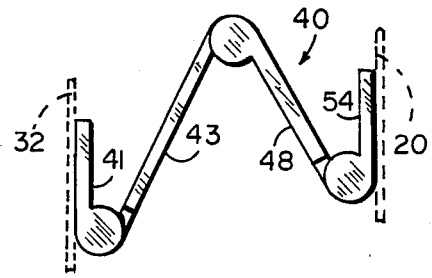
FIG. 8 is a rear elevational view of the hinge means shown in FIG. 5 shown in a position for attachment between the support and headrest elements shown in FIGS. 3 and 4.

Intermediate plate 43 is secured to a second intermediate plate 48 by pivot axle 44 with plate 43 having a pair of tines supporting opposite ends of axle 44 and as best seen in FIG. 7. Member 48 includes a first tang with a semi-cylindrical open socket 49 for snap-fitting over axle 44 and pivoting with respect thereto. Intermediate section 48 also includes a second tang 51 with a semi-cylindrical socket opposite socket 49 with an opening which snap-fits and pivots with respect to axle 46. Axle 46 is supported by the fork tines 52 of end plate 54 which in turn is secured to member 20 by means of a pair of fastening bolts extending through apertures 55 therein. With such arrangement, the tri-axle pivoted hinge means 40 and its identical hinge 50 can pivot into a position shown in FIG. 8 which when mounted on axes orthogonal to each other as illustrated by lines A and B in FIG. 4 prevent twisting and tilting of headrest 30 with respect to support plate 20 and allows parallelogram-type movement of the plate 30 directly away from and toward support member 20. In a preferred embodiment the hinge means 40 and 50 are made of a polymeric material such a Celcon with the pivot axles being made of steel and molded in place to end supports 41 and 54 and the tines of intermediate section 43. The hinges may also be made of steel.

Thus the system of the present invention provides a relatively inexpensive, easily adjustable headrest with a minimum number of components several of which can be injection molded to provide an improved infinitely adjustable headrest support for use in a vehicle such as an automobile. It will become apparent to those skilled in the art that various modifications to the preferred embodiment of the invention described and disclosed herein can be made without departing from the spirit and scope thereof as defined by the appended claims.

The embodiments of the invention in which an exclusive property or privilege is claimed are defined as follows:

1. An adjustable headrest assembly for a vehicle seat comprising:
    support means for attachment to the back of a seat, said support means including a headrest support member;
    a headrest;
    a pair of orthogonally aligned pivot means each having multiple parallel pivot axes which are orthogonal to the pivot axes of the other pivot means for coupling said headrest to said headrest support member for guided and controlled movement toward and away from said headrest support member; and
    fluid cylinder means mounted between said headrest and said headrest support member for selectively moving said headrest to a selected position with respect to said headrest support member.

2. The apparatus as defined in claim 1 wherein said fluid cylinder means comprises a pneumatic cylinder.

3. The apparatus as defined in claim 2 wherein said pneumatic cylinder comprises a bellows.

4. The apparatus as defined in claim 3 and further including bias member coupled between said headrest and said headrest support means for urging said headrest in a direction toward said headrest support member.

5. The apparatus as defined in claim 1 wherein said pivot means comprises a pair of hinge means, said hinge means mounted with the axis of one of said hinge means offset in generally orthogonal relationship to the axis of the other of said hinge means.

6. The apparatus as defined in claim 5 wherein each of said hinge means comprises four sections and axle means pivotally coupling each section to an adjacent section.

7. The apparatus as defined in claim 6 wherein said fluid cylinder comprises a pneumatic cylinder.

8. The apparatus as defined in claim 7 wherein said pneumatic cylinder comprises a bellows.

9. The apparatus as defined in claim 8 and further including bias means coupled between said headrest and said headrest support member for urging said headrest in a direction toward said headrest support member.

10. The apparatus as defined in claim 17 and further including means for inflating and deflating said bellows.

11. The apparatus as defined in claim 10 wherein said headrest is generally cylindrical with a concave recess formed therein for overlying said headrest support member.

12. The apparatus as defined in claim 11 wherein said headrest assembly further includes upholstery means extending between said headrest and said headrest support member.

13. An adjustable headrest assembly comprising:
support means for attachment to the back of a seat, said support means including a headrest support member;
a headrest;
means for movably mounting said headrest to said headrest support member for guided and controlled movement toward and away from said headrest support member comprising a pair of hinge means each including four sections each joined to an adjacent section by a pivot axle, said hinge means mounted with the axes of said pivot axles of one of said hinge means offset in generally orthogonal relationship to the axes of said axles of the other of said hinge means; and
fluid cylinder means mounted between said headrest and said headrest support member for selectively moving said headrest to a selected position with respect to said headrest support member.

14. The apparatus as defined in claim 13 wherein said fluid cylinder means comprises a pneumatic bellows.

15. The apparatus as defined in claim 14 and further including bias means coupled between said headrest and said headrest support member for urging said headrest in a direction toward said headrest support member.

16. The apparatus as defined in claim 14 and further including means for inflating and deflating said bellows.

17. The apparatus as defined in claim 15 wherein said headrest is generally cylindrical with a concave recess formed therein for overlying said headrest support member.

18. The apparatus as defined in claim 16 wherein said headrest assembly further includes upholstery means extending between said headrest and said headrest support member.

* * * * *